United States Patent [19]

St. Louis

[11] Patent Number: 5,273,590
[45] Date of Patent: Dec. 28, 1993

[54] PRESSURE PULSE CLEANING FOR ADSORPTION TOWER DISTRIBUTORS

[75] Inventor: Daniel M. St. Louis, Plymouth, Mich.

[73] Assignee: The Babcock & Wilcox Company, New Orleans, La.

[21] Appl. No.: 940,087

[22] Filed: Sep. 3, 1992

Related U.S. Application Data

[62] Division of Ser. No. 809,377, Dec. 18, 1991, Pat. No. 5,259,446.

[51] Int. Cl.⁵ .............................. B08B 9/00; B08B 9/93
[52] U.S. Cl. ................................. 134/22.1; 134/22.11; 134/22.12
[58] Field of Search ................ 134/22.1, 22.11, 22.12; 423/580; 376/316

[56] References Cited

U.S. PATENT DOCUMENTS

| 3,807,960 | 4/1974 | Thayer | 423/580 |
| 3,894,364 | 7/1975 | Korn et al. | 51/320 |
| 3,981,977 | 9/1976 | Mandel | 423/580 |
| 4,562,885 | 1/1986 | Pausch | 165/84 |

Primary Examiner—R. Bruce Breneman
Assistant Examiner—Zeinab El-Arini
Attorney, Agent, or Firm—Daniel S. Kalka; Vytas R. Matas; Robert J. Edwards

[57] ABSTRACT

An on-line method and apparatus for dislodging deposits from the distributors (12) in an adsorption tower (10) thereby cleaning the tower (10) by causing a surge in a fluid to dislodge the blocked openings (14) of the distributors (12).

8 Claims, 5 Drawing Sheets

PRESSURE PULSE CLEANING FOR ADSORPTION TOWER DISTRIBUTORS

This is a division of application Ser. No. 07/809,377 filed Dec. 18, 1991 now U.S. Pat. No. 5,259,446.

FIELD OF THE INVENTION

The present invention relates in general to cleaning an adsorption tower, and more particularly to pressure pulse cleaning an adsorption tower to dislodge deposits from the distributors.

DESCRIPTION OF THE RELATED ART

Adsorption towers are devices known in the art to distill, refine or separate liquids. One such application is the upgrading of heavy water ($D_2O$) for nuclear power plants. FIG. 1 is a schematic diagram of a sectional view of such an adsorption tower. The tower (10) contains a plurality of distributors (12) oriented in a vertical arrangement. Each distributor (12) is essentially a large sprinkler with as many as four hundred 1/16 inch holes or openings (14) located on the bottom of tubes (16) extending out of the distributor (12), as best seen in FIG. 2. The heavy water descends through the tower (10) passing through each distributor (12) via the openings (14). A packing or heating coil (15) is ordinarily positioned under the distributor for filtering or heating in a known manner. Normally a liquid vapor such as $H_2O$ vapor in the example also enters the tower (10).

The problem with these devices is that the openings (14) in the distributors (12) become blocked over time from deposits carried by the liquid rendering the adsorption tower (10) ineffective in its function.

Currently, these towers have to be shut down and dismantled with all of the distributors being removed and then physically cleaned. Each opening (14) is cleaned one at a time. After cleaning, the distributors (12) are then reassembled in the towers (10).

In a nuclear generating station, shut downs may occur twice a year for a duration of six to eight weeks for cleaning the distributors. The shut downs are costly and cause radiation exposure to the workers as well as the environment.

U.S. Pat. No. 5,006,304 discloses a method for loosening and removing sludge and debris from a nuclear steam generator by submerging a lower portion in water and then generating a succession of shock waves in the water by means of pulses of a pressurized gas. The disclosed method requires the operation to be shut down during cleaning. Related patents disclosing similar subject matter include U.S. Pat. Nos. 5,019,329, 4,899,697 and 4,921,662.

U.S. Pat. No. 4,773,357 describes a method of cleaning the tube sheet of a heat exchanger by utilizing a water cannon for explosively discharging a quantity of water from the muzzle to dislodge sludge from the tube sheet of the heat exchanger. U.S. Pat. No. 4,905,900 describes a similar method.

Thus, there is a need for a method of cleaning distributors in an adsorption tower which may be used on-line without interrupting the operation of the tower to eliminate shutdowns. This cleaning method in a nuclear generation station should reduce or eliminate radiation exposure caused from opening the adsorption tower. Additionally, this cleaning method should prevent tritium releases to the atmosphere.

SUMMARY OF THE INVENTION

The present invention solves the aforementioned problems with the prior art as well as others by providing a method and apparatus for on-line cleaning of an adsorption tower having a plurality of distributors positioned therein. A regulated supply of a high pressure fluid is employed to generate a pressure pulse into the distributor for dislodging deposits blocking the openings therein.

In the preferred embodiment, an accumulator is filled with the fluid to a predetermined pressure, and then the fluid is released into the distributor through a pressure conduit to cause the surge. The surge in pressure dislodges the deposits blocking the openings of the distributor. In this fashion, the distributors may either be cleaned singly in a sequential manner or simultaneously.

An object of the present invention is to provide an on-line cleaning method and apparatus for dislodging deposits in the distributors of an adsorption tower.

Another object of the present invention is to provide a method and apparatus for a sequential on-line cleaning of the distributors in an adsorption tower.

A further object of the present invention is to provide such a device that is simple in design, rugged in construction, and economical to manufacture.

The various features of novelty which characterize the present invention are pointed out with particularity in the claims annexed to and forming a part of this disclosure. For a better understanding of the invention, and the operating advantages attained by its uses, reference is made to the accompanying drawings and descriptive matter in which a preferred embodiment of the invention is illustrated.

DESCRIPTION OF THE PREFERRED EMBODIMENT

Figure 1:
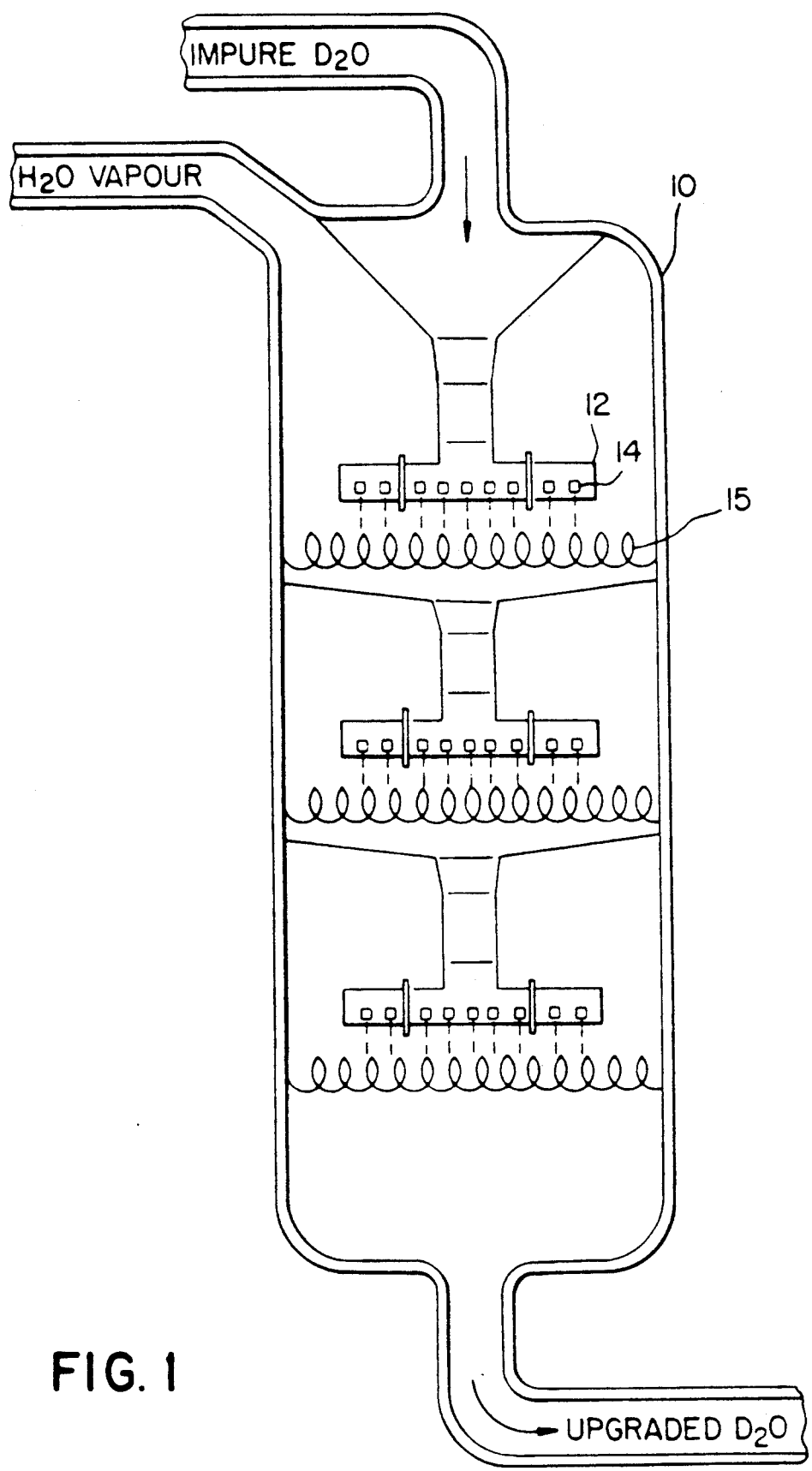
FIG. 1 is a sectional schematic representation of an adsorption tower used in upgrading $D_2O$ for a nuclear power plant.

Referring to the figures, where identical numerals designate similar or like features throughout the several views, there is shown an adsorption tower (10) used in upgrading $D_2O$ for a nuclear power plant. As explained earlier, the impure deuterium oxide ($D_2O$) enters the adsorption tower (10) from the top of the vessel with water ($H_2O$) vapor entering at the upper side of the vessel. The $D_2O$ descends through several distributors (12) positioned vertically within the tower (10). These devices are well known in this art and may be used to distill, refine, or separate various types of liquids. FIG. 1 depicts only one application for an adsorption tower which is the upgrading of heavy water.

In the adsorption tower (10), the distributors (12) are devices similar to a large sprinkler having a plurality of holes or openings (14) situated on the bottom of tubes

Figure 2:
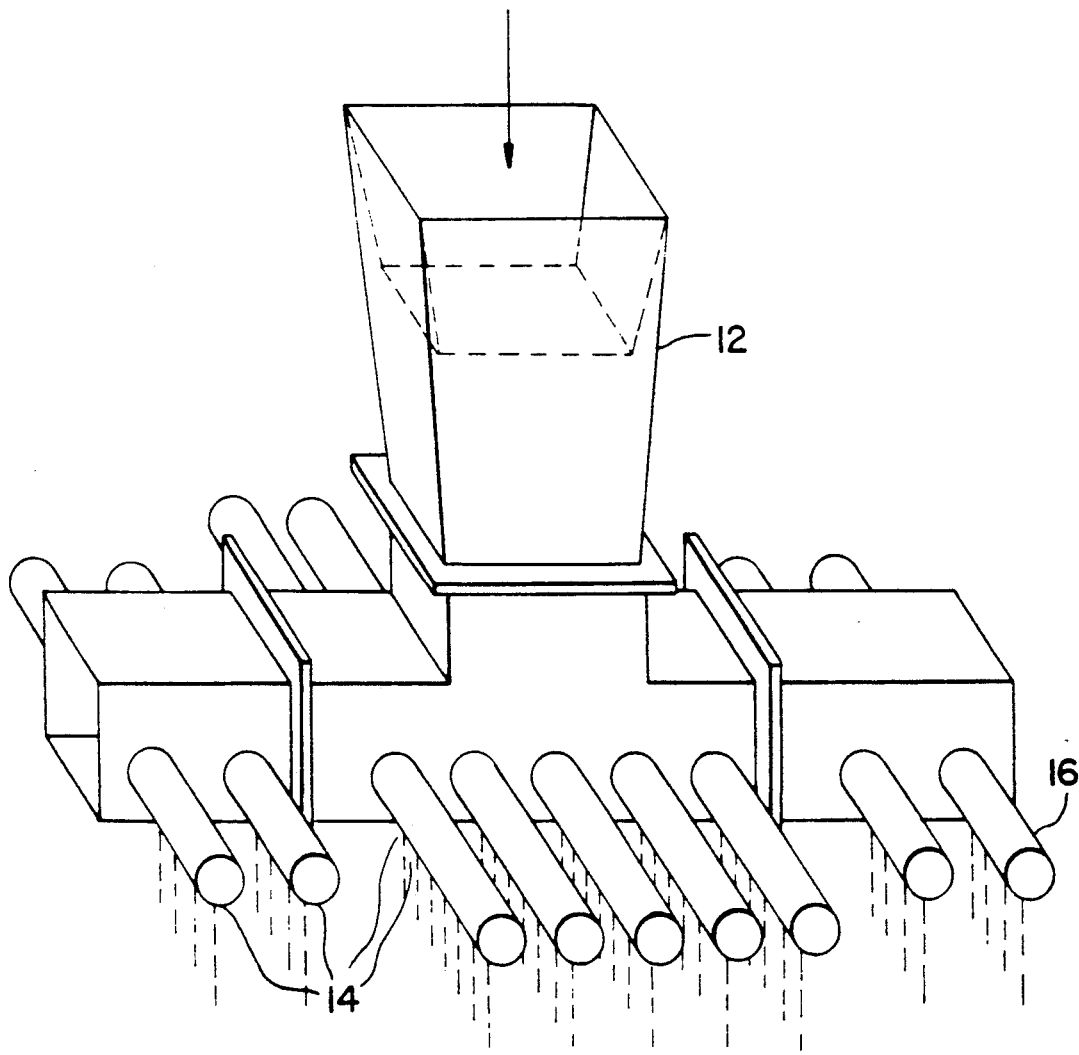
FIG. 2 is an elevational perspective view of the distributor.

(16) which extend on both sides of the distributor as shown in FIG. 2. Deposits are carried by the liquid entering the distributor (12) in the direction of the arrow causing a blockage of the openings (14) and the tube (16) of the distributor (12). The flow of the liquid through openings (14) are shown in dashed lines.

Figure 3:
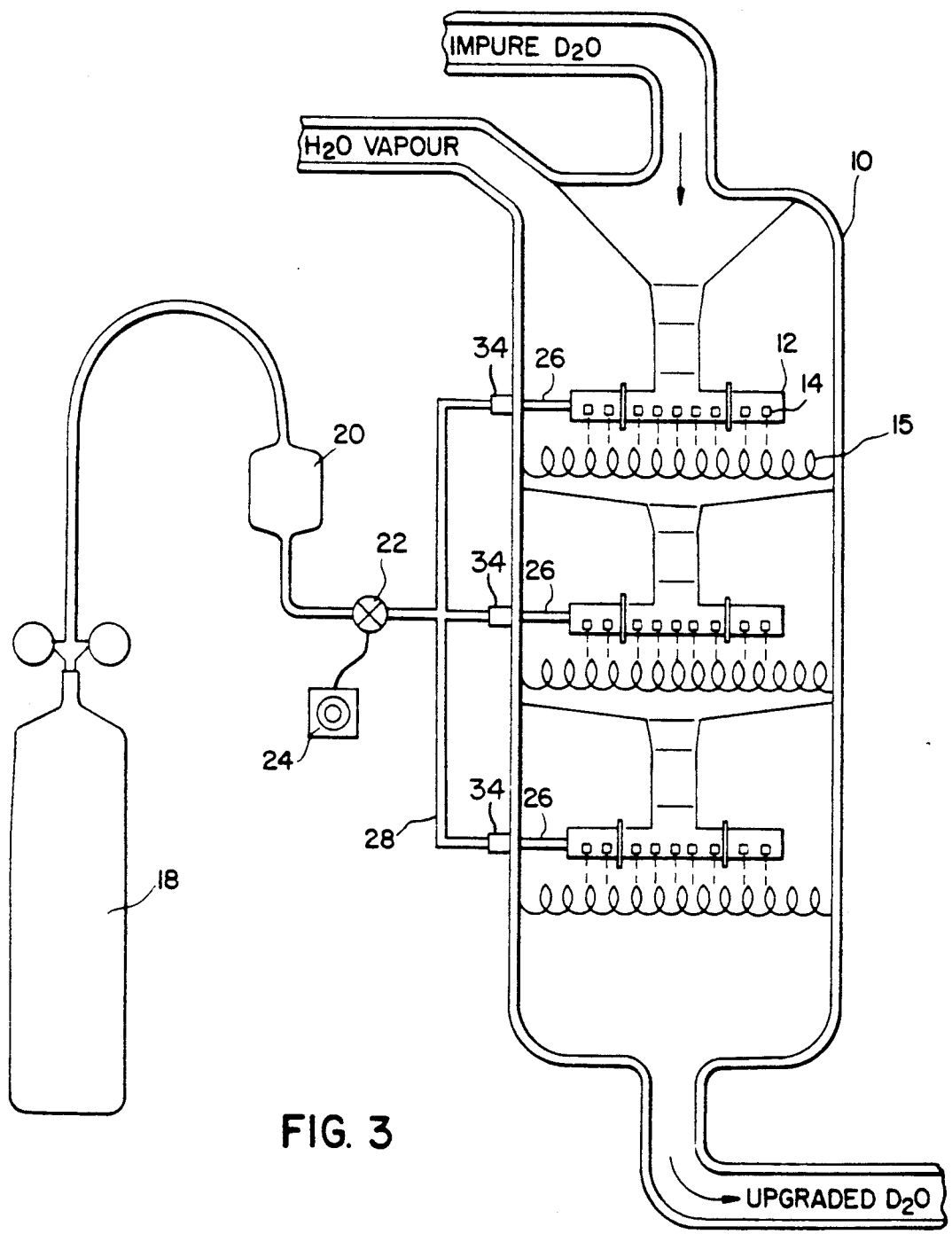
FIG. 3 is a sectional schematic representation of an embodiment of the present invention.

Referring to FIG. 3, there is shown one embodiment of the present invention attached to the distributors (12) of the adsorption tower (10). A regulated supply of a high pressure fluid (18) such as nitrogen fills an accumulator (20) to a predetermined pressure. Valve switch (24) actuates a high speed valve (22) either manually or automatically to cause a surge of nitrogen through a common manifold (28) into the pressure conduits or lines (26) into the distributors (12). The nitrogen rapidly expands in the liquid in the distributors (12) which causes a pressure rise for dislodging any deposits blocking the openings (14).

Even though FIG. 3 shows a common manifold (28) with only one valve (22), it is apparent that each distributor can have its own valve (22) for a more selective control with the use of a computer or microprocessor (not shown). This allows the distributors to be cleaned invididually when necessary, sequentially, or simultaneously on-line without disrupting the process underway in the tower.

Figure 4:
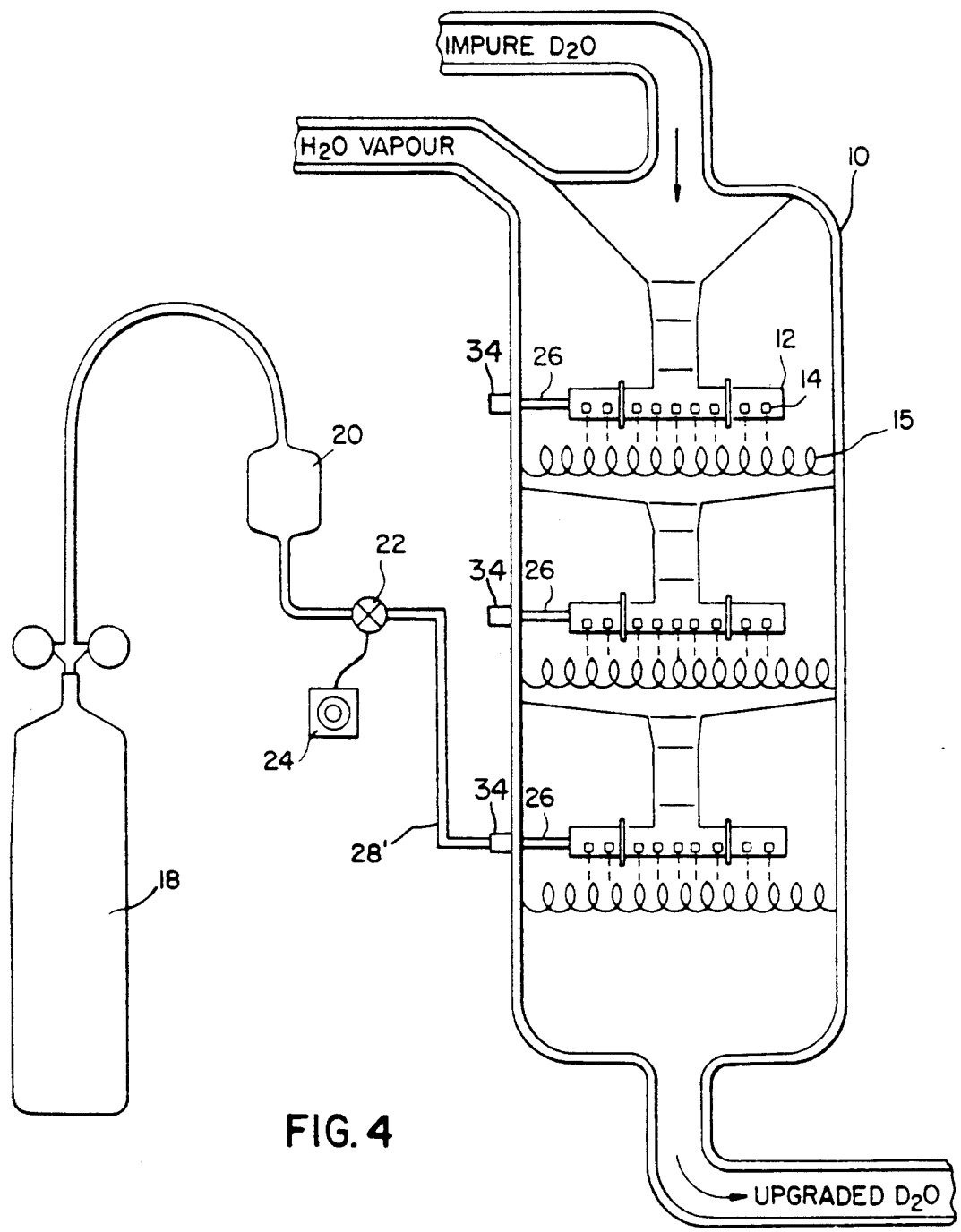
FIG. 4 is a sectional schematic representation of an alternate embodiment of the present invention.

An alternate embodiment includes the distributors (12) being connected individually to a single flexible line (28') as shown in FIG. 4. The valve switch (24) controls valve (22) either manually or automatically with the assistance of an optional computer. Preferably, quick connect couplers (34) are employed and positioned outside the adsorption tower (10) to provide a means for quick connection to each distributor (12). After all of the distributors are cleaned, the device may be moved on to the next adsorption tower or away from the surrounding area. Advantageously, a single device may be used to quickly clean several towers with little exposure to the hostile environment. Quick connect couplers (34) are readily available for high pressure fluids. Those employed for compressed air are suitable for the present invention. Either of the embodiments shown in FIGS. 3 and 4 can use these quick connect couplers. The pressure conduits (26) may be fastened to the distributors in any of several different manners to provide a pressure tight seal.

Experimental tests revealed that a pressure of 1000 psi in the accumulator achieves a pressure rise of about 40 psi in a single distributor which sufficiently cleans all of the 1/16 inch holes in a $D_2O$ upgrader.

Figure 5:
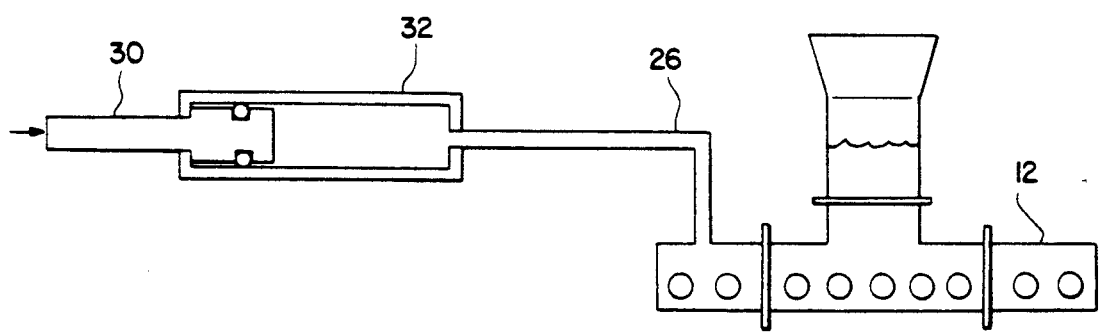
FIG. 5 is a sectional schematic representation of still another embodiment of the present invention attached to a single distributor.

FIG. 5 depicts still another embodiment of the present invention which utilizes the injection of a liquid at high velocity into the distributor (12). An external force indicated by the arrow may be used either manually or automatically to drive a piston (30) of a pump (32) having a cavity of a predetermined volume and connected to a supply of fluid for injecting the liquid through the pressure conduit (26) into the distributor (12) at a very fast rate. This causes a pressure rise throughout the distributor of sufficient magnitude to clear the blocked openings. Either of the embodiments in FIGS. 3 or 4 may be modified to use the injection of a liquid as shown in FIG. 5 rather than a gas.

A further embodiment of the present invention utilizes ultrasonic transducers positioned in each of the distributors. The ultrasonic transducers are then actuated by a microprocessor or computer periodically to keep the holes clear.

While specific embodiments of the present invention have been shown and described in detailed to illustrate the application and principles of the invention, it will be understood that it is not intended that the present invention be limited thereto and that the invention may be embodied otherwise without departing from such principles.

What is claimed is:

1. An on-line method for cleaning an adsorption tower having a plurality of distributors positioned therein with each of the distributors having a plurality of openings susceptible to blockage, comprising the steps of:

providing a supply of a high pressure fluid;

releasing a surge of the fluid from the supply with an accumulator and valve switching means connected thereto into a conduit connected to each of the distributors;

passing the surge of fluid through the conduit directly into the distributors to cause a pressure rise therein; and dislodging deposits blocking the openings in each of the distributors with the pressure rise of the fluid surging therethrough thereby cleaning the adsorption tower.

2. A method as recited in claim 1, further comprising the step of filling the accumulator with the fluid to a predetermined pressure.

3. A method as recited in claim 2, wherein the fluid is nitrogen.

4. method as recited in claim 2, wherein the releasing step includes the step of releasing instantaneously the fluid from the accumulator into the distributors.

5. A method as recited in claim 1, wherein the predetermined pressure in the accumulator is about 1000 psi.

6. A method as recited in claim 1, wherein the releasing step is sequentially performed in one distributor after another.

7. A method as recited in claim 1, wherein the releasing step is performed simultaneously on all distributors.

8. A method as recited in claim 1, wherein the fluid is a gas.

* * * * *